C. H. CUTTING.
MILK STRAINER.
APPLICATION FILED MAY 10, 1919.
1,349,120. Patented Aug. 10, 1920.
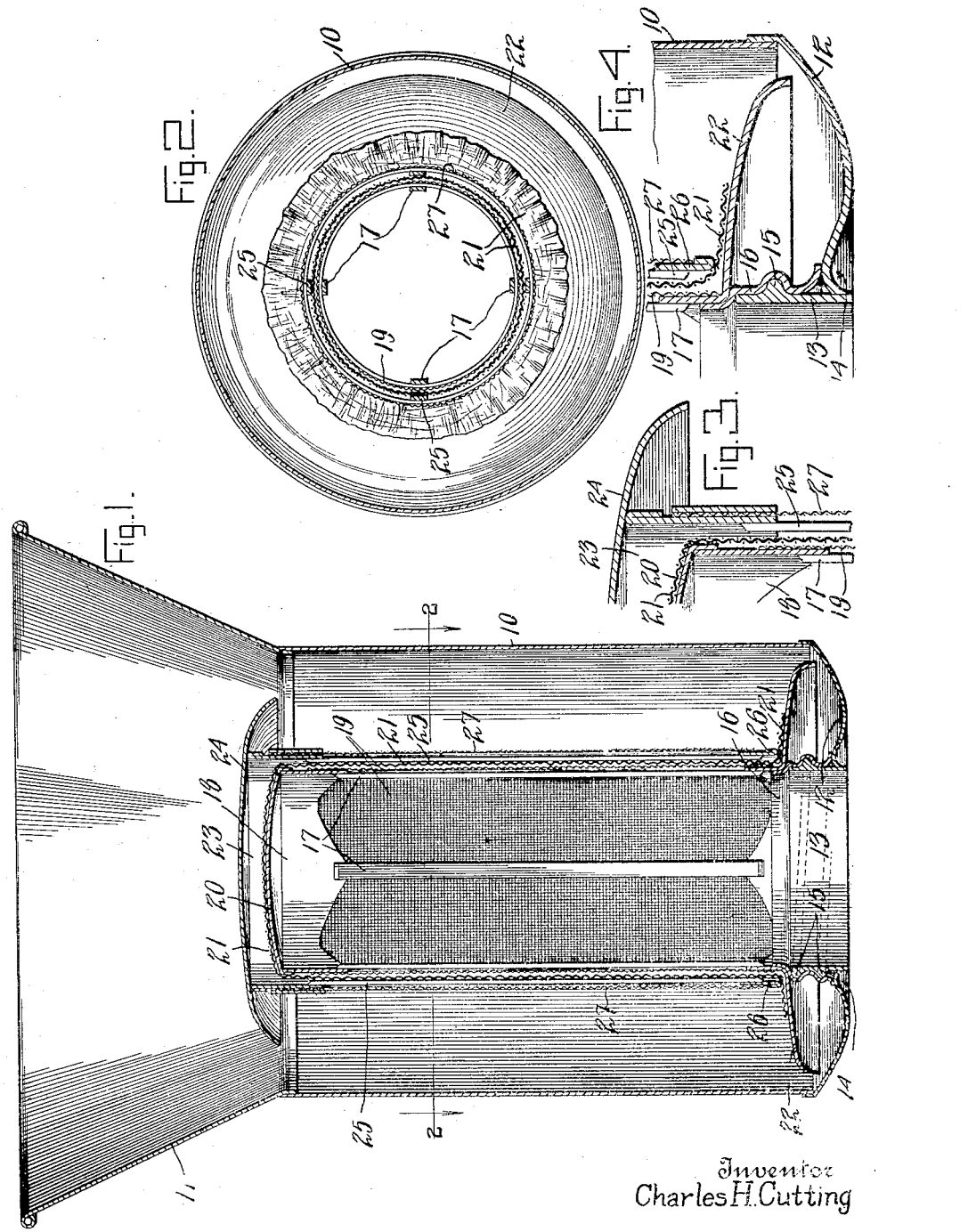
Inventor
Charles H. Cutting

UNITED STATES PATENT OFFICE.

CHARLES H. CUTTING, OF ALAMEDA, CALIFORNIA.

MILK-STRAINER.

1,349,120.

Specification of Letters Patent.  Patented Aug. 10, 1920.

Application filed May 10, 1919. Serial No. 296,074.

*To all whom it may concern:*

Be it known that I, CHARLES H. CUTTING, a citizen of the United States, residing at Alameda, in the county of Alameda and State of California, have invented certain new and useful Improvements in Milk-Strainers, of which the following is a specification.

My said invention consists in an improved construction of strainers, designed especially for milk strainers, its purpose being to provide such a strainer which will effectually separate dirt and foreign substance from the milk and collect the same in a convenient position for removal and in a manner to maintain the dirt so collected out of contact with the main body of the milk; also to provide a strainer which can be readily taken apart for cleaning and kept in a thoroughly sanitary condition, all as will be hereinafter more fully described and claimed.

Referring to the accompanying drawing, which is made a part hereof and on which similar reference characters indicate similar parts, Figure 1 is a central vertical section through a strainer constructed in accordance with my said invention, Fig. 2, a cross section looking in the direction indicated by the arrows from the dotted line 2—2 in Fig. 1, and Figs. 3 and 4, detail views on an enlarged scale.

Said strainer consists of a casing or outer shell 10, preferably cylindrical in form, having a hopper-like top 11 and a closed bottom 12 provided with a central collar 13 constituting an outlet from the strainer. Around the lower end of said collar 13 is formed an annular depression 14 adjacent to which is a bulged down portion forming an annular chamber in bottom 12 to receive the dirt. Said central collar 13 is preferably provided with a spiral thread 15 on its outside surface for a purpose to be presently described. The bottom 12, as above stated, is formed concave or curved downwardly, its lowest part being adjacent to the collar 13.

Another collar 16 is mounted on collar 13 by means of a spiral groove which engages with the spiral thread 15. Said collar 16 has uprights 17 soldered, riveted, or otherwise secured thereto at intervals around its circumference, four of said uprights being shown and this being the preferable number. A ring 18 is connected to the upper ends of said uprights in a similar manner, thus constituting a central frame which is covered by a fine mesh screen 19, preferably of fine copper wire. The top of ring 18 is covered by a metal cap 20. The structure thus formed constitutes a centrally disposed upright cylindrical screen or strainer standing in the center of the shell 10 closed at its top and opening into the central collar 13 at the bottom.

Mounted over this central structure is a screen or strainer 21, preferably composed of fabric such as "cheese-cloth." This fabric strainer covers the brass gauze screen 19 from top to bottom, preferably extending out for a distance at the bottom over the top of an annular deflector 22. Said deflector 22 is secured to the collar 16 and projects outwardly nearly to shell 10 with its outer edge curved downwardly to approach the bottom 12 at a point nearly at its outer edge. The space between said deflector 22 and bottom 12 is comparatively narrow and constitutes an entrance to an annular chamber thus formed around the collar 13.

Another ring 23 is adapted to surround ring 18, being somewhat larger in diameter so that it is spaced therefrom. On the top of said ring 23 is secured a cover 24 with a convex top and downwardly turned outer edges projecting beyond the ring 23 so as to overhang the sides of the central strainer and serve to deflect the milk coming into the hopper 11 away from immediate contact with the top end of said strainer. Said ring 23 is connected by uprights 25 with a ring 26 adapted to rest on the top surface of deflector 22 immediately adjacent the upper end of collar 16. The uprights 25 are of a length to support the deflector top 24 the distance required above the top 20 of the central screen. Another cylindrical strainer is formed by surrounding the uprights 25 with wire strainer cloth 27 secured at its upper end to the ring 23 and at its lower end to the ring 26.

With the strainer thus constructed and assembled as shown in the drawings the milk is poured into the hopper 11 and flows therefrom into the annular space surrounding the strainer, then through the wire strainer 27, the cheese-cloth strainer 21 and the wire strainer 19 into the central chamber which the strainer surrounds and from which the milk flows through collar 13 into the milk can or other receptacle on which the strainer is mounted. The dirt and foreign substance in the milk fall by gravity to the bottom of the structure and naturally pass under deflector 22 through the narrow open space surrounding its edge, where they are retained in the chamber beneath. The direction of flow of the milk being constantly downward tends to wash all such substance toward the bottom of the structure and carry it into this pocket or chamber beneath deflector 22 where it is effectually retained until the straining operation is completed. To clean the strainer it is only necessary to lift out the outer strainer by means of the top 24, then remove the cheese-cloth strainer, then take hold of the top of the inner strainer and give it a part of a turn to free it from the connection with the spiral rib 15 on the collar 13 when it can be lifted out, together with the deflector 22 attached to its lower end, thus readily separating all parts and enabling the dirt contained in the concave bottom 12 to be readily removed and all of the parts thoroughly cleaned and sterilized.

By this construction a strainer is provided which is comparatively inexpensive to manufacture, very durable in use and very effective in operation, and one which can be maintained in a perfectly sanitary condition with comparatively little trouble or labor.

Having thus fully described my said invention, what I claim as new and desire to secure by Letters Patent, is:

1. A strainer comprising an outer shell formed with an annular bottom around a central opening, an inner strainer surrounding said central opening and extending upwardly therefrom, an annular deflector extending outwardly from the bottom of said central strainer and forming a chamber between said deflector and the bottom with a narrow space between the outer edge of said deflector and said bottom and a second strainer surrounding said central strainer and formed with a closed top overhanging the upper end of the strainer structure, substantially as set forth.

2. A strainer comprising an outer shell having a hopper-like top and an annular bottom with a central opening, said annular bottom being curved downwardly, an annular deflector projecting from the central opening outwardly over said bottom with its outer edge curved downwardly to nearly meet the surface of said bottom, a cylindrical strainer extending upwardly from the edge of said central opening, a cloth strainer covering said central strainer, and an outer cylindrical strainer having a closed top and adapted to telescope over said inner strainer, substantially as set forth.

3. A strainer comprising an outer shell with a hopper-like top and an annular bottom curved downwardly from its outer edge toward its inner edge, a central strainer structure removably secured around said central opening, a deflector extending outwardly from the lower end of said central strainer structure, an outer strainer structure adapted to telescope over said central strainer structure and having a closed top overhanging the top of the strainer, and a cloth strainer mounted between said two other strainers, substantially as set forth.

4. A strainer comprising a casing having a bottom with a central opening therein, a cylindrical strainer structure extending up from the edge of said opening through said casing, another strainer structure with a deflector top adapted to telescope over said first mentioned strainer structure with said deflector top overhanging said outer strainer structure, substantially as set forth.

5. A strainer comprising a casing with a central outlet opening, a strainer structure mounted around said opening and extending upwardly therefrom, and a deflector below said strainer structure projecting out over the bottom of the casing to form a protected dirt pocket or receptacle, substantially as set forth.

In witness whereof I have hereunto set my hand and seal at San Francisco, California, this 29th day of April, A. D. nineteen hundred and nineteen.

CHARLES H. CUTTING. [L. S]

Witnesses:
WILLIAM KEHOE,
CLIFTON H. CONNICK.